United States Patent [19]
Hutta

[11] Patent Number: 4,898,603
[45] Date of Patent: Feb. 6, 1990

[54] METHOD FOR MANUFACTURING HALIDE GLASS OPTICAL FIBER

[75] Inventor: Joseph J. Hutta, Groton, Mass.

[73] Assignee: The United States of America as represented by the Secretary of the Air Force, Washington, D.C.

[21] Appl. No.: 223,185

[22] Filed: Jul. 25, 1988

[51] Int. Cl.⁴ .................... C03B 15/16; C03B 37/018
[52] U.S. Cl. ...................... 65/3.13; 65/3.11; 65/3.3; 65/60.5; 65/60.8; 65/DIG. 16
[58] Field of Search .................. 65/45, 48, 60.5, 60.8, 65/11.1, 3.11, 3.13, 3.3, DIG. 16

[56] References Cited

U.S. PATENT DOCUMENTS

| | | | |
|---|---|---|---|
| 2,992,517 | 7/1961 | Hicks, Jr. | 65/60.8 X |
| 4,040,807 | 8/1977 | Midwinter et al. | 65/3 A |
| 4,217,123 | 8/1980 | Titchmarsh | 65/3 A |
| 4,341,873 | 7/1982 | Robinson et al. | 501/40 |
| 4,378,987 | 4/1983 | Miller et al. | 65/3.12 |
| 4,445,755 | 5/1984 | Ohsawa et al. | 350/96.34 |
| 4,519,826 | 5/1985 | Tran | 65/3.11 |
| 4,537,864 | 8/1985 | Tick | 501/30 |
| 4,729,777 | 3/1988 | Mimura et al. | 65/11.1 |
| 4,735,856 | 4/1988 | Schultz et al. | 428/366 |

OTHER PUBLICATIONS

Rawson, Harold, "Inorganic Glass-Forming Systems", Non-Metallic Solids, Academic Press, N.Y., 1967, pp. 2 to 3, 66 to 67.

Primary Examiner—Arthur Kellogg
Attorney, Agent, or Firm—Stanton E. Collier; Donald J. Singer

[57] ABSTRACT

A halide glass core fiber is clad by providing two melts that selectively join to form the molten clad fiber in a temperature range from 580° C. to 600° C. A separate heating means controls the fiber melt at the die nozzle. Because of the low viscosity and the narrow proto congelation temperature zone, the clad fiber is extruded and drawn in the vertical direction counter the effect of gravity.

3 Claims, 2 Drawing Sheets

METHOD FOR MANUFACTURING HALIDE GLASS OPTICAL FIBER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical fibers, and, more particularly, to halide glass optical fibers.

The use of optical fibers for carrying information is of special interest because of several advantages such as security, physical integrity and multiple channel transmission.

In addition to pulse-broadening, transmission loss also limits the distance an optical waveguide can carry light. Transmission loss occurs because of several factors. Impurities in the waveguides absorb some of the transmitted light. In addition, thermal compositional fluctuations, phase separations, inhomogeneities within the waveguide as well as geometric variations in the size of the fiber core scatter a portion of the transmitted light.

If splices must be made because sufficiently long waveguides may not be produced from available performs, these splices further increase transmission loss.

Because fluoride glasses are several orders of magnitude more transparent than conventional silica based glass, fluoride glass has been often mentioned as a material from which to make efficient, low-loss optical fibers. Until now, however, several difficulties have made the use of fluoride glass in optical fibers impractical. Conventional cladding techniques, such as a chemical vapor deposition, cannot be used to make a fluoride glass perform because of the high vapor pressures of fluoride raw materials.

One method of making clad optical fibers is noted in "*Preparation of Low-Loss Fluoride Glass Fibers*" Electron. Lett , Vol. 18, pp. 170–171 (1982), incorporated herein by reference. According to that process the fluoride cladding melt is poured into a mold which is then upset. The center of the melt flows out and a cylindrical tube is thus formed. Next, the fluoride core melt is poured in to form a preform. The limitations and disadvantages of this process are as follows:

(a) Due to the rapid change in the fluoride glass viscosity with respect to temperature, the cylindrical tube obtained by upsetting the mold is not concentric which leads to undesirable variations in the preform core-clad ratio.

(b) Again due to this high viscosity dependence on temperature, the preparation of long preforms, and therefore long waveguides, is not possible.

(c) And finally, this process appears to be limited to step-index multimode fluoride fibers.

Another method of making such glass fibers is noted in U.S. Pat. 4,519,826 which is incorporated by reference. In this method the cladding glass is poured into a thermally-conductive vertically disposed rotating mold. The mold is then rotated about its vertical axis to allow the cladding glass to coat the bore surface of the mold. The mold is then rapidly changed to a horizontal position while continuing rotation. The centrifugal force from rotation causes the mold to uniformly coat the bore surface of the mold. Rotation is continued until the temperature of the fluoride cladding glass approaches about the temperature of the mold, thus forming a cladding tube. Core glass may melt then be introduced into the cladding tube, thus forming a preform. The preform may then be drawn into an optical fiber.

One possible problem is that the preform must be reheated for the pulling of the clad fiber.

SUMMARY OF THE INVENTION

The present invention is directed at a therein method of producing clad halide glass fibers without the complications of the past.

The clad fiber forming apparatus of the present invention has two adjacent melt chambers maintained at selected isothermal conditions to promote the forming of the clad fiber. The core melt is forced into a core forming tube which passes partially through the chamber with the clad melt therein. At an exit orifice the core tube terminates with a flow space thereabout into which the clad melt flows about the core melt. The clad optical fiber is extruded from the exit orifice in the vertical direction counter gravity and handled as desired.

Therefore, one object of the present invention is an apparatus for forming clad halide optical fibers without the need of a preform.

Another object of the present invention is a method of forming clad halide optical fibers.

These and many other objects and advantages of the present invention will be readily apparent to one skilled in the pertinent are from the following detailed description of a preferred embodiment of the invention and the related drawings.

DETAILED DESCRIPTION OF THE PREFERRED EMBODIMENT

Heavy Metal Fluoride Glass (HMFG) melts have the viscosity of water (a fraction of a poise) from higher temperatures (800°–700° C.) right down to where first perceptible congealing or stiffening of the melt occurs. This is shown as zone A in FIG. 2.

This is not a problem with silica, the material used in present state-of-the-art optical telecommunications fiber. As shown by H. Rawson in *Inorganic Glass-Forming Systems,* Academic Press, Table 1, page 5, 1967, the viscosity of silica at its melting point is ten million poises.

Silica melts have such vanishingly low crystallization tendency that the reheated preform fiber-draw is preferentially used to soften or fluidize the glass to the requisite $10^5$ to $^6$ poise (100,000 to 1,000,000) for fiber drawing.

As shown in FIG. 22B of the above reference, the temperature range over which this optimal viscosity develops is around 250°, a very wide working range.

Figure 2:
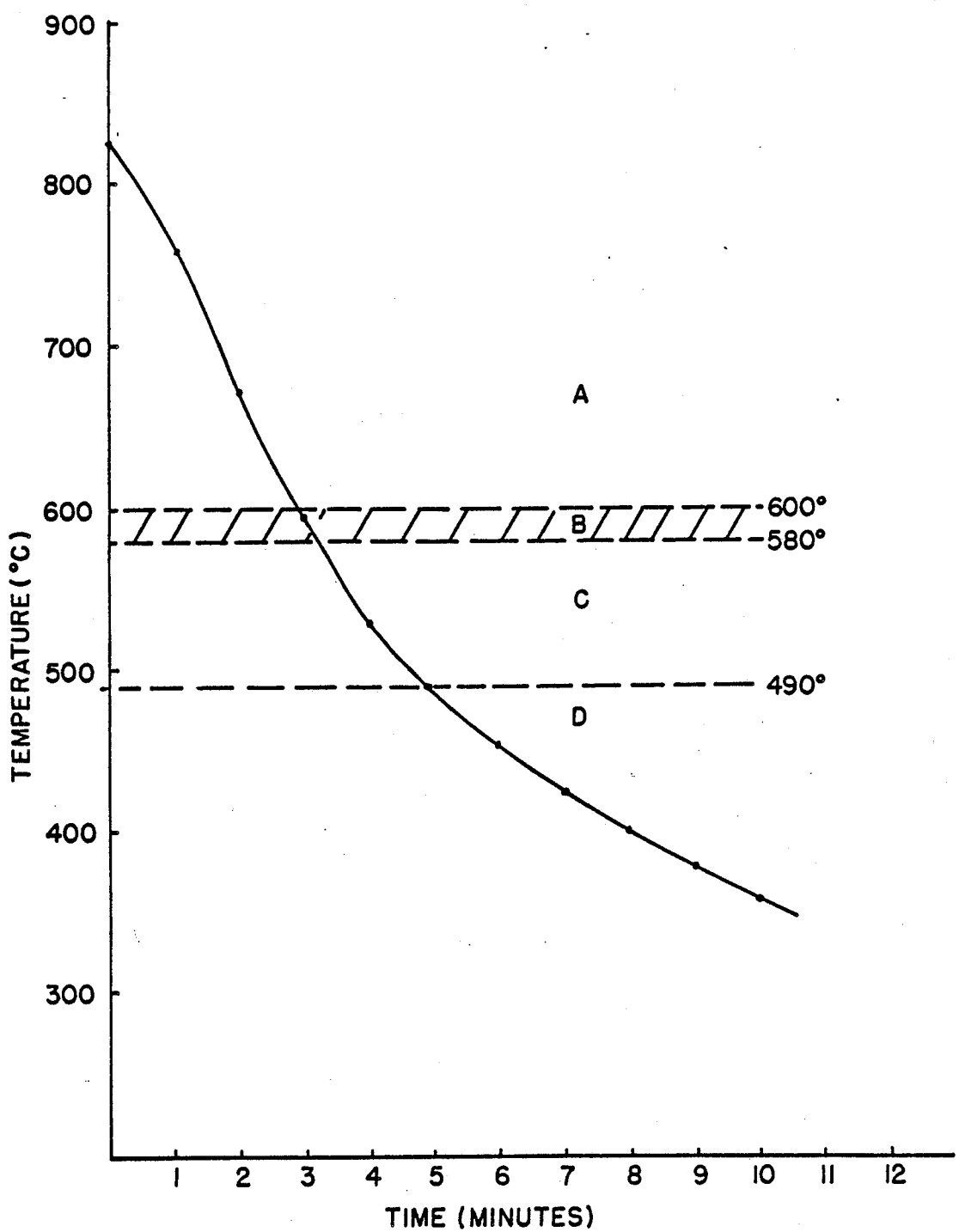
FIG. 2 illustrates by graph the selected isothermal temperature to form clad halide optical fibers.

With HMFG melts, on the other hand, this "working range" is of the order of 25 degrees, see FIG. 2, section B. It is therefore unlikely that the Remelted Preform Method, so successful for silica, will work for practical production of HMFG optical fiber. The problem is the exceedingly strong crystallization tendency of halides, in general. Beryllium fluoride ($BeF_2$) is a special case because of the small size of the Be atom and its high polarization power.

Crystallization or devitrification of high quality fluorozirconate (HMFG) glass has been observed, at a temperatures as low as 290° C., a full 25° below the glass transition temperature ($T_g$) where the glass only begins to become plastic.

The use of a conventional double crucible method shown in U.S. Pat. No. 4,217,123, incorporated by reference, where the fiber is drawn from the bottom with the aid of gravity has been found to be impracticable because the halide fiber, typically terminates (breaks), as a result of the very low viscosity.

Figure 1:
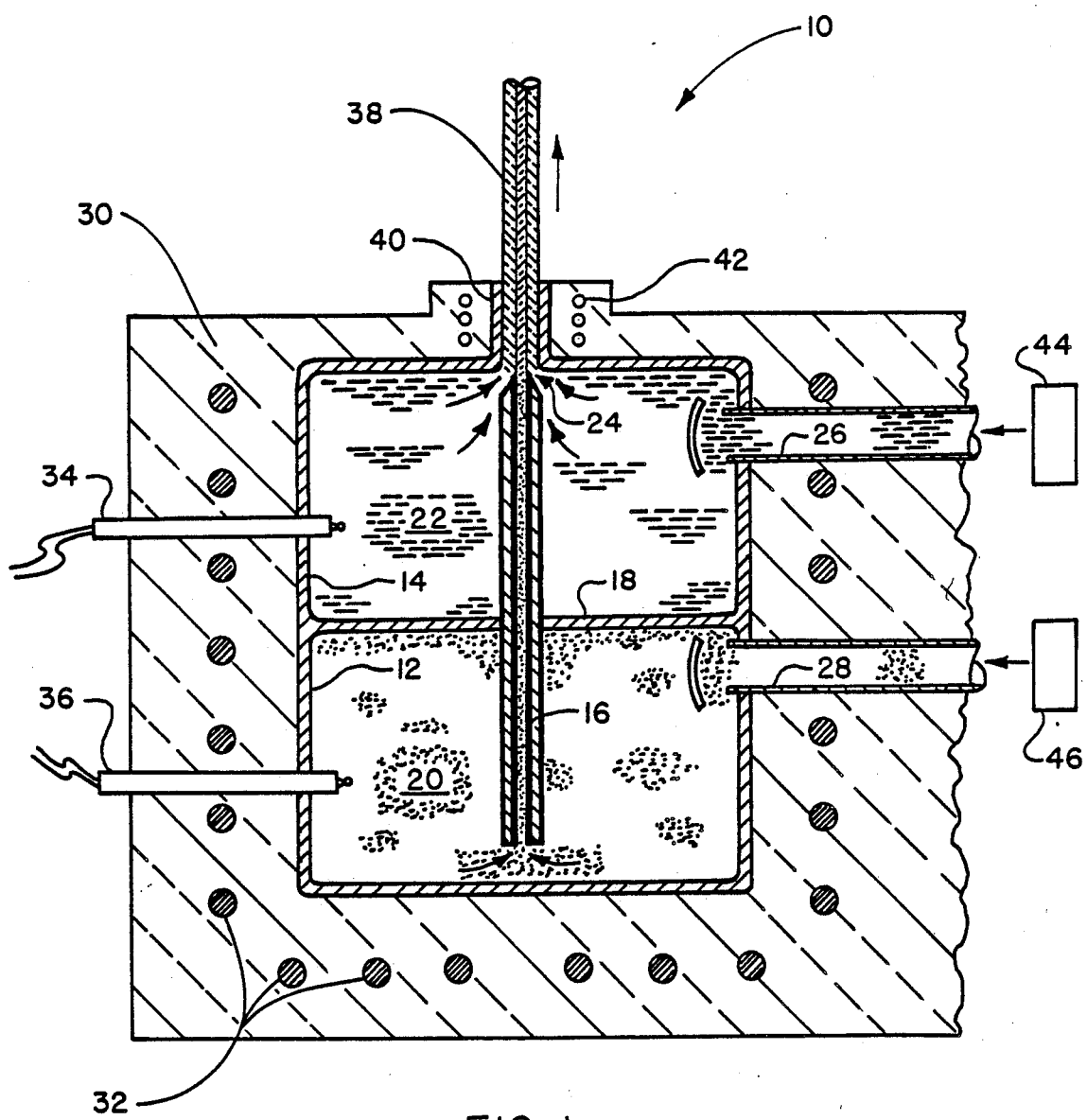
FIG. 1 illustrates by cross-section the clad optical fiber forming apparatus.

A specific embodiment of the invention would be a system utilizing the rheological/temperature factors described by this invention to realize production of multikilometer lengths of infrared-transmitting optical fibers for long distance, radiation-hard voice communication and wide bandwidth, low bit-error rate, high bit-rate data transmission. A glass fiber forming apparatus configuration is shown schematically in FIG. 1. FIG. 1 graphically shows only the essential glass fiber forming apparatus 10. This apparatus 10 can contain the entire supply of the glass-forming melts or can be supplied from separate reservoirs 44 and 46 as indicated at the right-hand margin. As shown in FIG. 1, a clad fiber 38 is being extruded and drawn in the vertical direction counter gravity.

In FIG. 1, apparatus 10 is partitioned into a core-glass melt chamber 12 and a cladding-glass melt chamber 14. A nonreactive conduit 16 (gold or platinum), affixed to a dividing partition 18, both feeds and isolates the core-glass melt 20 to the point where the cladding-glass melt 22 merges with, surrounds, and bonds to it at a fiber-forming orifice 24. For ultralong, continuous lengths, a continuous supply of core-glass melt can be injected at input 28 and cladding-glass melt introduced at input 26, from separate nearby reservoirs The injection of the core-glass melt at input 28 causes the extrusion of clad fiber 38. The cladding glass melt must be maintained in cladding glass melt chamber 14 at a sufficient level to coat the core fiber extruding from conduit 16.

The entire apparatus 10 is surrounded by insulating material 30 within which a plurality of heating elements 32 are embedded to produce and maintain an isothermal environment within which the melts are held to within 0.1 degrees C. within the temperature range or zone wherein the glass melts are in a semi-congealed or gelatinous state in which polymerization is occurring. Temperature change is sensed by thermocouples 34 and 36 connected to power controller, not shown. It is clearly understood from the above that the chambers 12 and 14 may be separately heated to achieve the temperature wherein the glass melts are in a semi-congealed or gelatinous state.

In order to prevent the freezing of clad fiber 38 before exiting die nozzle 40, die nozzle 40 is held at a temperature between 580° C. to 600° C. Nozzle 40 and orifice 24 should be 580° C. to 600° C. Nozzle 40 and orifice 24 should be held isothermally within the proto congelation temperature zone. A separate heating means 42 is located about orifice 24 and nozzle 40. This zone B is depicted in FIG. 2, which represents the actual cooling-curve for fluorozirconate and fluorohafnate melts as well as the temperatures at which the visually-observed changes in the character of the melts occur.

It is emphasized that the fiber-draw/extrusion temperature zone described in this invention and shown in FIG. 2 is applicable to fluorozirconate or fluorohafnate melts. For other heavy metal fluoride or halide glass compositions, the temperature zone would be shifted to higher or lower temperatures, depending upon composition.

Because of the consistency of heavy metal fluoride glass melts, and halide melts in general, the transition from watery to semi-congealed to jello-like to a completely rigid solid occurs within about 100 degrees; these glasses do not behave like fused silica which has no sharp viscosity change over a temperature range of 800+ degrees, and therefore cannot be dealt with in the same manner as in producing glass fiber.

Clearly, many modifications and variations of the present invention are possible in light of the above teachings and it is therefore understood, that within the inventive scope of the inventive concept, the invention may be practiced otherwise than specifically claimed.

What is claimed is:

1. A process of manufacturing a clad optical halide glass fiber, said process comprising the steps of:
   (a) providing a heavy metal fluoride core-glass melt, said melt being within a desired temperature range;
   (b) providing a clad-glass melt, said clad-glass melt being within a desired temperature range;
   (c) causing said core-glass melt to flow through a core conduit;
   (d) causing said clad-glass melt to flow through an orifice;
   (e) positioning an output end of said core conduit centrally near said orifice such that said core-melt is cylindrically enclosed by said clad-glass melt whereby a HMFG optical fiber is formed in a molten condition;
   (f) maintaining the molten optical fiber flowing through a die nozzle within a desired temperature range;
   (g) extruding said molten optical fiber from said die nozzle in a vertical direction;
   (h) drawing said molten optical fiber in a vertical direction counter gravity; and
   (i) allowing said molten optical fiber to cool to form a solid optical fiber.

2. A process as defined in claim 1 wherein the halide glass is fluorozirconates and fluorahafnates.

3. A process as defined in claim 2, step f, wherein said temperature range is from about 580° C. to about 600° C.

* * * * *